United States Patent
Ito et al.

(10) Patent No.: US 6,397,009 B1
(45) Date of Patent: May 28, 2002

(54) ZOOM LENS SYSTEM AND ADJUSTING METHOD OF SAME

(75) Inventors: Takayuki Ito, Saitama; Hiroyasu Ozaki, Tokyo; Takuji Hamasaki, Saitama, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 107 days.

(21) Appl. No.: 09/589,062

(22) Filed: Jun. 8, 2000

(30) Foreign Application Priority Data

Jun. 9, 1999 (JP) ............................................. 11-162573

(51) Int. Cl.[7] ........................... G03B 17/00; G02B 15/14
(52) U.S. Cl. ........................................ 396/79; 359/694
(58) Field of Search ............................ 396/529, 79, 72; 359/694, 703, 695

(56) References Cited

U.S. PATENT DOCUMENTS

| | | | |
|---|---|---|---|
| 4,759,618 A | * 7/1988 | Kamata | 359/703 X |
| 5,218,476 A | 6/1993 | Ito | 359/676 |
| 5,293,192 A | * 3/1994 | Akitake et al. | 359/695 X |
| 5,475,457 A | 12/1995 | Tanaka | 396/83 |
| 5,850,577 A | 12/1998 | Ito | 396/80 |
| 6,236,523 B1 | * 5/2001 | Iikawa et al. | 359/703 X |

* cited by examiner

*Primary Examiner*—W. B. Perkey
(74) *Attorney, Agent, or Firm*—Greenblum & Bernstein, P.L.C.

(57) ABSTRACT

A zoom lens system includes at least three lens groups, in which the distance between at least two lens groups of the at least three lens groups is varied during zooming, the zoom lens system having a first adjustment mechanism for mechanically adjusting a first lens group in the optical axis direction upon assembly and adjustment; a second adjustment mechanism for mechanically adjusting a second lens group, which is different from the first lens group, in the optical axis direction upon assembly and adjustment; and a third adjustment mechanism for mechanically adjusting a third lens group, which is different from the first and second lens group, in the optical axis direction upon assembly and adjustment.

5 Claims, 4 Drawing Sheets

ZOOM LENS SYSTEM AND ADJUSTING METHOD OF SAME

BACKGROUND OF THE INVENTION

1. Field of the Invention

The present invention relates to a zoom lens system having at least three lens groups and, and more precisely, relates to a zoom lens system in which the zoom adjustment can be mechanically and precisely carried out. The present invention also relates to an adjusting method using the zoom lens system.

2. Description of the Related Art

In a zoom lens system, a zoom adjustment to make a focal plane thereof coincident with a film surface (image forming surface of a camera) without moving the focal plane during zooming must be carried out. Strictly speaking, an adjustment to prevent the focal plane of the zoom lens from moving during zooming is referred to as a zoom adjustment, and an adjustment to make the focal plane coincident with the film surface (image forming surface) is referred to as a back adjustment, respectively. In the specification of the present application, the zoom adjustment includes both the above-mentioned zoom adjustment and the back adjustment. Conventionally, the zoom adjustment is carried out by mechanically adjusting the positions of the constituent lens groups of the zoom lens system upon assembly and adjustment of the zoom lens system.

In recent electrically controlled zoom lens systems in which the positions of the lens groups can be pulse-controlled, the amount of zoom adjustment is stored in a ROM for each discrete focal length and each discrete object distance as pulse-number data. When a shutter release button is depressed upon photographing, the positions of the lens groups are adjusted in accordance with focal length data and object distance data (pulse-number data), taking into account the amount of zoom adjustment. In this type of zoom lens system, no mechanical adjustment is necessary.

However, in a zoom lens system which is marketed as a separate lens unit, such as an interchangeable lens, a mechanical adjustment must be carried out. In conventional zoom lens systems, the shift (deviation) of the focal plane at the short focal length extremity and the long focal length extremity is corrected by a mechanical adjustment at two points in the variable focal length. However, it is impossible to precisely correct the shift of focal plane at an intermediate focal length. In a zoom lens system whose depth of focus is small, focal plane shift at an intermediate focal length is not negligible.

SUMMARY OF THE INVENTION

It is an object of the present invention to provide a zoom lens system having at least three lens groups, in which zoom adjustment can be mechanically and precisely carried out.

To achieve the object mentioned above, according to an aspect of the present invention, a zoom lens system is provided, which includes at least three lens groups, in which the distance between at least two lens groups of the at least three lens groups is varied during zooming, the zoom lens system including a first adjustment mechanism for mechanically adjusting a first lens group of the at least three lens groups in the optical axis direction upon assembly and adjustment; a second adjustment mechanism for mechanically adjusting a second lens group of the at least three lens groups, which is different from the first lens group, in the optical axis direction upon assembly and adjustment; and a third adjustment mechanism for mechanically adjusting a third lens group of the at least three lens groups, which is different from the first and second lens group, in the optical axis direction upon assembly and adjustment.

According to another aspect of the present invention, a zoom lens system is provided, which includes at least three lens groups, in which the distance between at least two lens groups of the at least three lens groups is varied during zooming, the zoom lens system including a first adjustment mechanism for mechanically adjusting a first lens group, of the at least three lens groups, closest to the object side in the optical axis direction upon assembly and adjustment; a second adjustment mechanism for mechanically adjusting a second lens group, of the at least three lens groups, closest to the image side in the optical axis direction upon assembly and adjustment; and a third adjustment mechanism for mechanically adjusting a variable power lens group, of the at least three lens groups, upon assembly and adjustment; wherein the variable power lens group is one of moved and not moved during zooming in the optical axis direction.

According to another aspect of the present invention, an adjusting method for a zoom lens system is provided, which includes at least three lens groups in which the distance between at least two lens groups of the at least three lens groups is varied during zooming, the zoom lens system being provided with a first adjustment mechanism which adjusts a position of a first lens group of the at least three lens groups closest to the object side in the optical axis direction, upon assembly and adjustment; a second adjustment mechanism which adjusts a position of one of all of the at least three lens groups and a lens group closest to the image side in the optical axis direction, upon assembly and adjustment; and a third adjustment mechanism which adjusts a position of a variable power lens group of the at least three lens groups in the optical axis direction upon assembly and adjustment, wherein the variable power lens group is one of moved and not moved during zooming. The adjusting method includes performing a correction to make the positions of the focal planes at the short focal length extremity and at the long focal length extremity of the zoom lens system coincident with an image forming plane of a camera, using the first and second adjustment mechanisms; measuring a focal plane shift at an intermediate focal length of the zoom lens system and performing an adjustment to make the positions of the focal planes, of the zoom lens system, at the short focal length extremity, at the long focal length extremity and at the intermediate focal length coincident with each other; and performing a correction to make the positions of the focal plane, of the zoom lens system, at the short focal length extremity and at the long focal length extremity coincident with the image forming surface of the camera, using the first and second adjustment mechanisms.

Preferably, the following condition (1) is satisfied:

$$0.01 < |\Delta P(fM)/\Delta t3| < 0.9 \tag{1}$$

wherein $\Delta t3$ designates the amount of adjustment performed by the third adjustment mechanism, and $\Delta P(fM)$ designates the focal plane shift at the intermediate focal length after the positions of the focal planes at the short focal length extremity and at the long focal length extremity are made coincident with the image forming surface of the camera.

According to another aspect of the present invention, an adjusting method for a zoom lens system is provided, which includes at least three lens groups in which the distance between at least two lens groups of the at least three lens groups is varied during zooming, the zoom lens system being provided with a first adjustment mechanism which adjusts a position of a first lens group of the at least three lens groups closest to the object side in the optical axis direction, upon assembly and adjustment; a second adjustment mechanism which adjusts a position of one of all of the at least three lens groups and a lens group closest to the image side in the optical axis direction, upon assembly and adjustment; and a third adjustment mechanism which adjusts a position of a variable power lens group of the at least three lens groups which is one of moved and not moved during zooming in the optical axis direction, upon assembly and adjustment. The adjusting method includes measuring the focal plane shifts ΔP(fS), ΔP(fM) and ΔP(fL) at the short focal length extremity fS, at an intermediate focal length fM, and at the long focal length extremity fL, respectively, from a reference point; calculating the amounts of adjustment Δt1, Δt2 and Δt3 by the first, second and third adjustment mechanisms, using the measurements of ΔP(fs), ΔP(fM) and ΔP(fL); by the following sensitivity matrix A of the first, second and third adjustment mechanisms which is represented by the following formula 4; and by the following formula 5:

$$A = \begin{bmatrix} \frac{\partial Pc(f_S)}{\partial t_1} & \frac{\partial Pc(f_S)}{\partial t_2} & \frac{\partial Pc(f_S)}{\partial t_3} \\ \frac{\partial Pc(f_M)}{\partial t_1} & \frac{\partial Pc(f_M)}{\partial t_2} & \frac{\partial Pc(f_M)}{\partial t_3} \\ \frac{\partial Pc(f_L)}{\partial t_1} & \frac{\partial Pc(f_L)}{\partial t_2} & \frac{\partial Pc(f_L)}{\partial t_3} \end{bmatrix} \quad \text{Formula 4}$$

$$\begin{bmatrix} \Delta t1 \\ \Delta t2 \\ \Delta t3 \end{bmatrix} = -A^{-1} \begin{bmatrix} P(f_S) \\ P(f_M) \\ P(f_L) \end{bmatrix} \quad \text{Formula 5}$$

(Wherein, $|A| \neq 0$)

and moving the at least three lens groups by the respective amounts of adjustment Δt1, Δt2 and Δt3 by the first, second and third adjustment mechanisms.

The present disclosure relates to subject matter contained in Japanese Patent Application No. 11-162573 (filed on Jun. 9, 1999) which is expressly incorporated herein by reference in its entirety.

BRIEF DESCRIPTION OF THE DRAWINGS

The present invention will be discussed below in detail, with reference to the accompanying drawings, in which.

DESCRIPTION OF THE PREFERRED EMBODIMENTS

Figure 1:
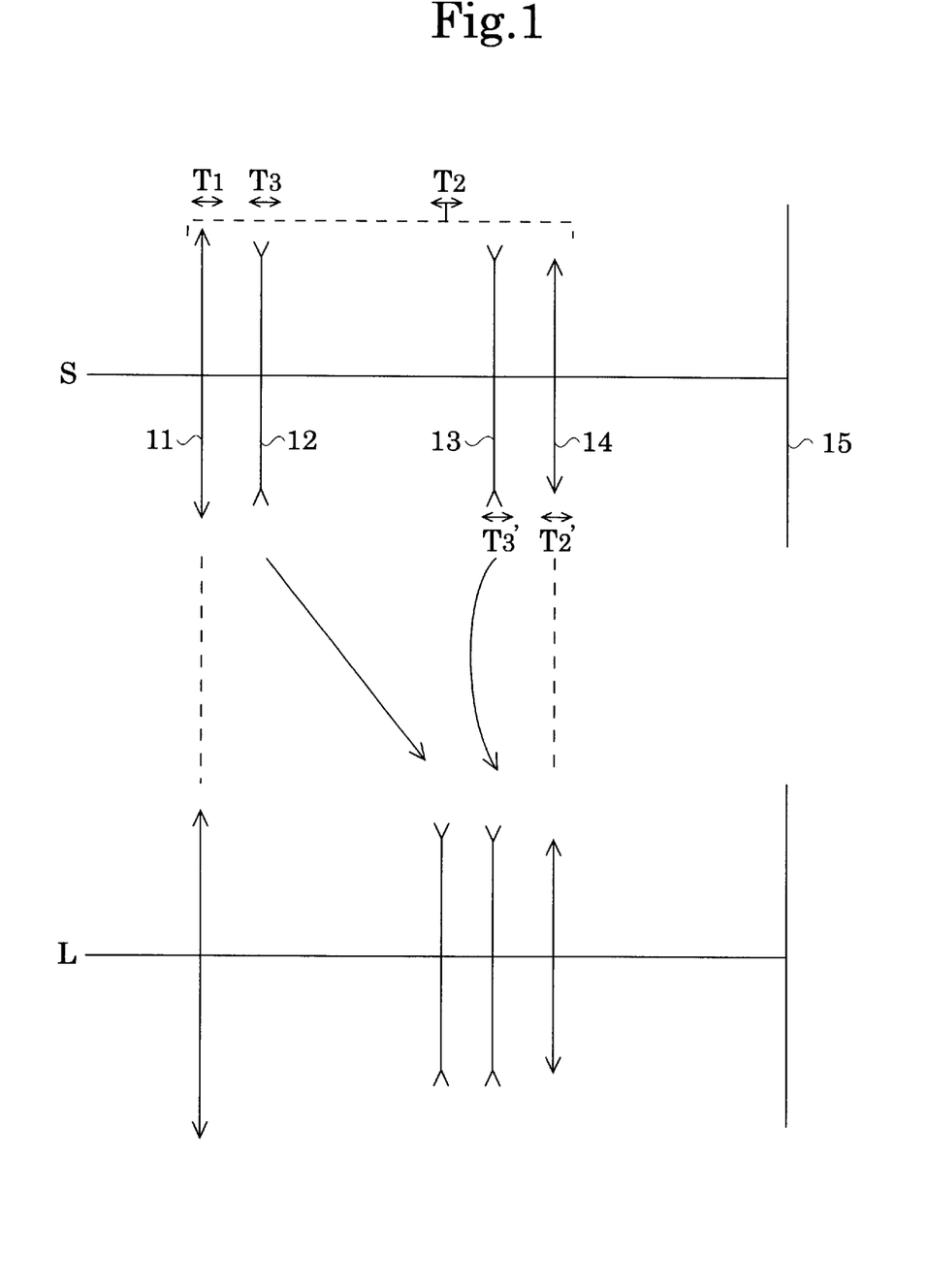
FIG. 1 is a schematic view of a first embodiment of an adjusting method of a zoom lens system according to the present invention.

FIG. 1 schematically shows a first embodiment of a zoom lens system adjusting method according to the present invention. The zoom lens system includes a first lens group (focusing lens group) 11 which is not moved upon zooming and is moved upon focusing, variable power lens groups (second and third lens groups) 12 and 13 which are moved upon zooming, and a stationary fourth lens group 14. These lens groups are arranged in this order from the object side. Designator 15 represents the position of an image forming surface of a camera. During zooming from the short focal length extremity (S) to the long focal length extremity (L), the second lens group 12 is moved monotonously from the object side toward the image side, and the third lens group 13 is moved first toward the object side and is thereafter moved toward the image side.

The zoom lens system is provided with a first adjustment mechanism T1 which adjusts the position of the first lens group 11 in the optical axis direction upon assembly and adjustment; a second adjustment mechanism T2 which adjusts the axial position of the first lens group 11 through the fourth lens group 14 upon assembly and adjustment; and a third adjustment mechanism T3 which adjusts the axial position of the second lens group 12 upon assembly and adjustment. It is possible to use the moving mechanism for the fourth lens group 14 as a second adjustment mechanism T2' in place of the second adjustment mechanism T2. Also, it is possible to use the moving mechanism T3' for the third lens group 13 as the third adjustment mechanism T3. The focal plane of the entire zoom lens system is moved in the optical axis direction when the fourth lens group 14 is moved in the optical axis direction. When the first lens group 11 is moved in the optical axis direction by an appropriate amount of displacement upon assembly and adjustment, the focal plane (the position of focal plane) at the short focal length extremity is made coincident with the focal plane (the position of focal plane) at the long focal length extremity. When the second lens group 12 or the third lens group 13 is moved in the axial direction upon assembly and adjustment, the focal plane (the position of focal plane) at an intermediate focal length can be corrected. The term 'focal plane' mentioned in the various descriptions herein refers to the focal plane of the zoom lens system.

Figure 2:
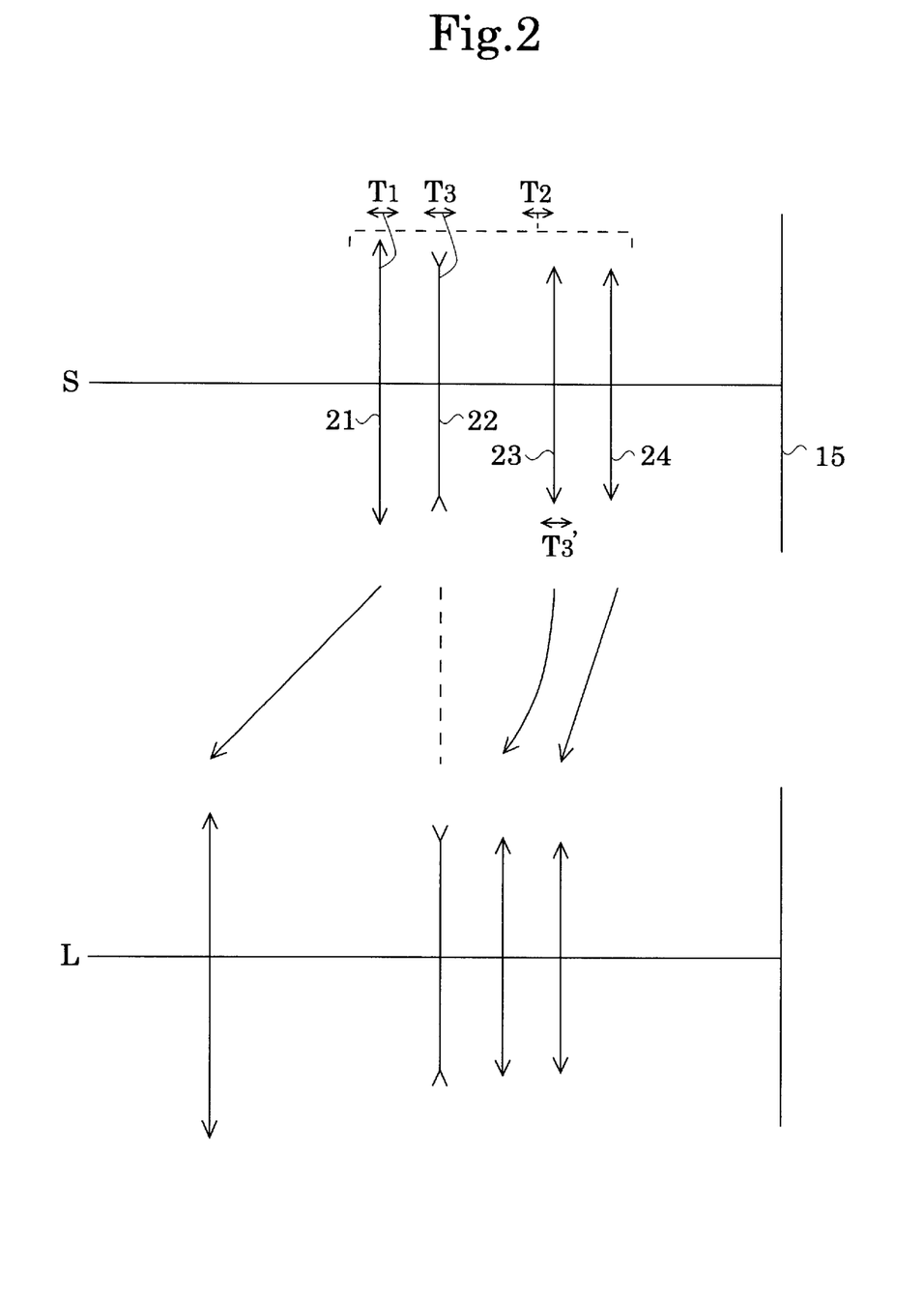
FIG. 2 is a schematic view of a second embodiment of an adjusting method of a zoom lens system according to the present invention.

FIG. 2 schematically shows a second embodiment of a zoom lens system adjusting method according to the present invention. The zoom lens system includes a first lens group 21 which is moved upon zooming or upon focusing, a stationary second lens group 22, and third and fourth lens groups 23 and 24 which are moved upon zooming. These lens groups are arranged in this order from the object side. During zooming from the short focal length extremity (S) to the long focal length extremity (L), the first lens group 21 is moved monotonously from the image side toward the object side, and the third and fourth lens groups 23 and 24 are moved from the image side toward the object side.

The zoom lens system is provided with a first adjustment mechanism T1 which adjusts the position of the first lens group 21 in the optical axis direction upon assembly and adjustment, a second adjustment mechanism T2 which adjusts the axial position of the first lens group 21 through the fourth lens group 24 upon assembly and adjustment, and a third adjustment mechanism T3 which adjusts the axial position of the second lens group 22 upon assembly and adjustment. It is possible to use the moving mechanism for the third lens group 23 as a third adjustment mechanism T3' in place of the third adjustment mechanism T3. When the first lens group 21 is moved in the optical axis direction by an appropriate amount upon assembly and adjustment, the focal plane (the position of focal plane) at the short focal length extremity is made coincident with the focal plane (the position of focal plane) at the long focal length extremity. When the second lens group 22 or the third lens group 23 is moved in the axial direction upon assembly and adjustment, the focal plane (the position of focal plane) at an intermediate focal length can be corrected.

Figure 3:
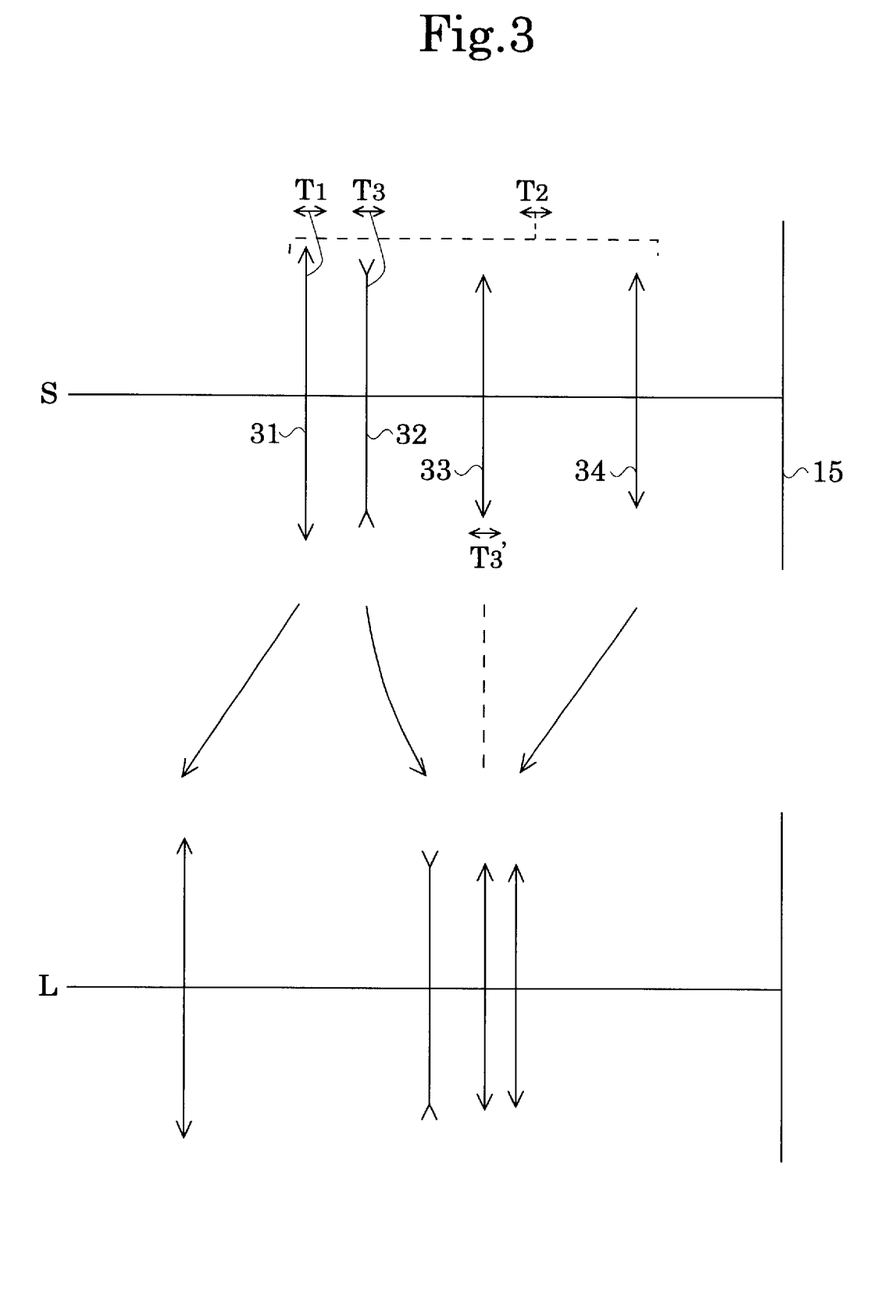
FIG. 3 is a schematic view of a third embodiment of an adjusting method of a zoom lens system according to the present invention; and, FIG. 4 is a longitudinal sectional view of an upper half of a zoom lens barrel, by way of example, used in an adjusting method of a zoom lens system according to the present invention.

FIG. 3 schematically shows a third embodiment of a zoom lens system adjusting method according to the present invention. The zoom lens system includes a first lens group 31 which is moved upon zooming or upon focusing, a second lens group 32 which is moved upon zooming, a stationary third lens group 33, and a fourth lens group 34 which is moved upon zooming. These lens groups are arranged in this order from the object side. During zooming from the short focal length extremity (S) to the long focal length extremity (L), the first lens group 31 and the fourth lens group 34 are moved from the image side toward the object side, and the second lens group 32 is moved from the object side toward the image side.

The zoom lens system is provided with a first adjustment mechanism T1 which adjusts the position of the first lens group 31 in the optical axis direction upon assembly and adjustment, a second adjustment mechanism T2 which adjusts the axial position of the first lens group 31 through the fourth lens group 34 upon assembly and adjustment, and a third adjustment mechanism T3 which adjusts the axial position of the second lens group 32 upon assembly and adjustment. It is possible to use the moving mechanism for the third lens group 33 as a third adjustment mechanism T3' in place of the third adjustment mechanism T3. When the first lens group 31 is moved in the optical axis direction by an appropriate amount upon assembly and adjustment, the focus at the short focal length extremity is made coincident with the focus at the long focal length extremity. When the second lens group 32 or the third lens group 33 is moved in the axial direction upon assembly and adjustment, the focal plane shift at an intermediate focal length can be corrected.

In the zoom lens system having three or more lens groups, as constructed above, the zoom adjustment is carried out in accordance with first or second method discussed below.

<First Method>

Step 1: At the long focal length extremity, the lens groups (T1-adjustment group) to be moved by the first adjustment mechanism T1 are moved, while viewing the focus state on the image forming surface of the camera to make the focal plane of the zoom lens system coincident with the image forming surface of the camera.

Step 2: At the short focal length extremity, the lens groups (T2-adjustment group) to be moved by the second adjustment mechanism T2 are moved, while viewing the focus state on the image forming surface of the camera to make the focal plane of the zoom lens system coincident with the image forming surface.

Step 3: The operations at steps 1 and 2 are repeated until the focal plane is made coincident with the image forming surface of the camera at the focal lengths of both the long focal length extremity and the short focal length extremity (Either of the steps 1 and 2 may be carried out prior to the other).

Step 4: The deviation $\Delta P(fM)$ of the focal plane (i.e., the focal plane shift) at a predetermined specific intermediate focal length from the image forming surface of the camera is measured.

Step 5: The displacement (amount of movement) $\Delta T3$ of the lens groups (T3-adjustment group) to be moved by the third adjustment mechanism T3 is calculated, based on the following formulae 1, 2 and 3.

$$\Delta T3 = -P(f_M)/\Delta P(f_M) \quad \text{Formula 1}$$

$$\Delta Pc(f_M) = \frac{\partial P(f_M)}{\partial t_3}\bigg|_{t_3=1} + \Delta t_1 \frac{\partial P(f_M)}{\partial t_1} + \Delta t_2 \frac{\partial P(f_M)}{\partial t_2} \quad \text{Formula 2}$$

$$\begin{bmatrix} \Delta t1 \\ \Delta t2 \end{bmatrix} = -B^{-1} \begin{bmatrix} \frac{\partial P(f_S)}{\partial t_3}\big|_{t_3=1} \\ \frac{\partial P(f_L)}{\partial t_3}\big|_{t_3=1} \end{bmatrix}, \quad \text{Formula 3}$$

$$B = \begin{bmatrix} \frac{\partial P(f_S)}{\partial t_1} & \frac{\partial P(f_S)}{\partial t_2} \\ \frac{\partial P(f_L)}{\partial t_1} & \frac{\partial P(f_L)}{\partial t_2} \end{bmatrix}$$

wherein

"$\Delta t1$" represents the displacement of the T1-adjustment group necessary to shift the focal plane so as to be coincident with the image forming surface of the camera at the short focal length extremity and at the long focal length extremity, when the T3-adjustment group is moved by $\Delta T3=1$;

"$\Delta t2$" represents the displacement of the T2-adjustment group necessary to shift the focal plane so as to be coincident with the image forming surface of the camera at the short focal length extremity and at the long focal length extremity, when the T3-adjustment group is moved by $\Delta T3=1$;

$\Delta Pc(fM)$ represents the expansion correction sensitivity at an intermediate focal length (this corresponds to a deviation of the focal plane from the image forming surface of the camera caused at an intermediate focal length when the focal plane shift is corrected by the adjustment mechanisms T1 and T2 when the T3-adjustment group is moved by $\Delta T3=1$).

Step 6: The T3-adjustment group is moved by the amount of adjustment $\Delta T3$ by the third adjustment mechanism T3.

Step 7: The operations at steps 1 and 2 are repeated until the focal plane is made coincident with the image forming surface of the camera at the short focal length extremity and the long focal length extremity.

<Second Method>

Step 1: The focal plane shifts $\Delta P(fs)$, $\Delta P(fM)$ and $\Delta P(fL)$ at the short focal length extremity (fS), at the intermediate focal length (fM), and at the long focal length extremity (fL), respectively, are measured from the image forming surface (reference point) 15 of the camera.

Step 2: The amounts of adjustment $\Delta t1$, $\Delta t2$ and $\Delta t3$ by the first, second and third adjustment mechanisms are calculated using the measurements $\Delta P(fS)$, $\Delta P(fM)$ and $\Delta P(fL)$; by the following sensitivity matrix A (formula 4) of the first, second and third adjustment mechanisms T1, T2 (or T2') and T3 (or T3'); and by the following formula 5:

$$A = \begin{bmatrix} \frac{\partial Pc(f_S)}{\partial t_1} & \frac{\partial Pc(f_S)}{\partial t_2} & \frac{\partial Pc(f_S)}{\partial t_3} \\ \frac{\partial Pc(f_M)}{\partial t_1} & \frac{\partial Pc(f_M)}{\partial t_2} & \frac{\partial Pc(f_M)}{\partial t_3} \\ \frac{\partial Pc(f_L)}{\partial t_1} & \frac{\partial Pc(f_L)}{\partial t_2} & \frac{\partial Pc(f_L)}{\partial t_3} \end{bmatrix} \quad \text{Formula 4}$$

-continued $$\begin{bmatrix} \Delta t1 \\ \Delta t2 \\ \Delta t3 \end{bmatrix} = -A^{-1} \begin{bmatrix} P(f_S) \\ P(f_M) \\ P(f_L) \end{bmatrix}$$ Formula 5

(Wherein, $|A| \neq 0$)

(Wherein, $|A| \neq 0$)

Step 3: The lens groups are moved by the respective amounts of adjustment $\Delta t1$, $\Delta t2$ and $\Delta t3$ by the first, second and third adjustment mechanisms T1, T2 and T3.

Numerical examples are given below:

<EXAMPLE 1>

Table 1 shows zoom lens data corresponding to the zoom lens system shown in FIG. 1. "S", "M" and "L" represent the short focal length extremity, the intermediate focal length, and the long focal length extremity, respectively; "f" represents the focal length, and "FNO" represents the F-number, respectively.

TABLE 1

|  | S | M | L |
|---|---|---|---|
| Data of the Entire Zoom Lens System | | | |
| f = | 12.87 | 40.00 | 63.00 |
| FNO = | 2.0 | 2.0 | 2.0 |
| Data of Each Lens Group | | | |
| Group No. | f | Magnification | |
| 1 | 91.973 | 0.000 | 0.000 | 0.000 |
| 2 | −21.018 | −0.376 | −0.940 | −1.547 |
| 3 | −39.804 | 0.313 | 0.389 | 0.372 |
| 4 | 31.064 | −1.191 | −1.191 | −1.191 |
| Focus Sensitivity | | | |
| 1 | | 0.020 | 0.190 | 0.470 |
| 2 | | 0.119 | 0.025 | −0.273 |
| 3 | | 1.280 | 1.204 | 1.222 |
| 4 | | −0.418 | −0.418 | −0.418 |

In the zoom lens system mentioned above, the first group corresponds to the T1-adjustment group (first adjustment mechanism T1); the second group corresponds to the T3-adjustment group (third adjustment mechanism T3); and the entire zoom lens group corresponds to the T2-adjustment group (second adjustment mechanism T2), respectively. In this zoom lens system, the first method and the second method are performed as follows:

<First Method>

1. The operations at step 1 through 3 are carried out to make the positions of the focal plane at the long focal length extremity and the focal plane at the short focal length extremity coincident with each other, and thereafter, the deviation of the focal point therefrom at an intermediate focal length is measured (i.e., the focal plane shift of the focal plane at the intermediate focal length is measured).

ΔP(fM)=0.082

2. The displacement ΔT3 of the T3-adjustment group is obtained in accordance with the formulae 1, 2 and 3.

ΔT3=−1.517

The expansion correction sensitivity ΔPc(fM) at the intermediate focal length is given by:

Δpc(fM)=0.054

3. The amount of adjustment ΔT3 is applied to the T3-adjustment group by the third adjustment mechanism T3.

4. The operations at steps 1 and 2 are repeated until the positions of the focal planes at the short focal length extremity and at the long focal length extremity are made coincident with the image forming surface of the camera.

<Second Method>

1. The focal plane shifts ΔP(fs), ΔP(fM) and ΔP(fL) at the short focal length extremity (S), at the intermediate focal length (M), and at the long focal length extremity (L), respectively, are measured from the image forming surface (reference point) 15 of the camera.

ΔP(fs)=0.129

ΔP(fM)=0.400

ΔP(fL)=0.630

2. The amounts of adjustment Δt1, Δt2 and Δt3 of the T1-, T2- and T3-adjustment groups are calculated using formulae 4 and 5.

T1-adjustment amount Δt1=−2.437

T2-adjustment amount Δt2=0.100

T3-adjustment amount Δt3=−1.517

3. The T1-adjustment group, T2-adjustment group and T3-adjustment group are moved by the T1-adjustment amount, the T2-adjustment amount, and the T3-adjustment amount, respectively.

<EXAMPLE 2>

Table 2 shows zoom lens data corresponding to the zoom lens system shown in FIG. 2.

TABLE 2

|  | S | M | L |
|---|---|---|---|
| Data of the Entire Zoom Lens System | | | |
| f = | 82.43 | 200.00 | 309.98 |
| FNO = | 4.5 | 5.3 | 5.7 |
| Data of Each Group | | | |
| Group No. | f | Magnification | |
| 1 | 150.066 | 0.000 | 0.000 | 0.000 |
| 2 | −30.844 | −0.318 | −0.622 | −0.868 |
| 3 | 43.779 | −2.262 | −2.821 | −3.142 |
| 4 | 3405.256 | 0.764 | 0.759 | 0.757 |
| Focus Sensitivity | | | |
| 1 | | 0.302 | 1.774 | 4.262 |
| 2 | | 2.685 | 2.811 | 1.395 |
| 3 | | −2.403 | −4.008 | −5.084 |
| 4 | | 0.416 | 0.424 | 0.427 |

In the zoom lens system mentioned above, the first group corresponds to the T1-adjustment group (first adjustment mechanism T1); the second group corresponds to the T3-adjustment group (third adjustment mechanism T3); and the entire zoom lens group corresponds to the T2-adjustment group (second adjustment mechanism T2), respectively. In this zoom lens system, the first method and the second method are performed as follows:

<First Method>

1. The operations at step 1 through 3 are carried out to make the positions of the focal plane at the long focal length extremity and the focal plane at the short focal length extremity coincident with each other, and thereafter, the deviation of the focal point therefrom at an intermediate focal length is measured (i.e., the focal plane shift of the focal plane at the intermediate focal length is measured).

ΔP(fM)=0.330

2. The displacement ΔT3 of the T3-adjustment group is obtained in accordance with the formulae 1, 2 and 3.

ΔT3=−0.545

The expansion correction sensitivity ΔPc(fM) at the intermediate focal length is given by:

ΔPc(fM)=0.605

3. The amount of adjustment ΔT3 is applied to the T3-adjustment group by the third adjustment mechanism T3.

4. The operations at steps 1 and 2 are repeated until the positions of the focal planes at the short focal length extremity and at the long focal length extremity are made coincident with the image forming surface of the camera.

<Second Method>

1. The focal plane shifts ΔP(fs), ΔP(fM) and ΔP(fL) at the short focal length extremity (S), at the intermediate focal length (M), and at the long focal length extremity (L), respectively, are measured from the image forming surface (reference point) 15 of the camera.

ΔP(fs)=0.824

ΔP(fM)=2.000

ΔP(fL)=3.100

2. The amounts of adjustment Δt1, Δt2 and Δt3 of the T1-adjustment group, T2-adjustment group and T3-adjustment group, respectively, are calculated using formulae 4 and 5.

T1-adjustment amount Δt1=−0.752

T2-adjustment amount Δt2=0.867

T3-adjustment amount Δt3=−0.545

3. The T1-adjustment group, T2-adjustment group and T3-adjustment group are moved by the T1-adjustment amount, the T2-adjustment amount, and the T3-adjustment amount, respectively.

<EXAMPLE 3>

Table 3 shows zoom lens data corresponding to the zoom lens system shown in FIG. 3.

TABLE 3

| | S | M | L |
|---|---|---|---|
| Data of the Entire Zoom Lens System | | | |
| f = | 36.12 | 70.00 | 102.04 |
| FNO = | 3.6 | 3.6 | 3.6 |
| Data Of Each Group | | | |
| Group No. | f | Magnification | |
| 1 | 79.770 | 0.000 | 0.000 | 0.000 |
| 2 | −21.354 | −0.438 | −0.685 | −0.946 |
| 3 | 84.295 | 3.637 | 3.005 | 2.912 |
| 4 | 51.844 | −0.284 | −0.426 | −0.464 |
| Focus Sensitivity | | | |
| 1 | | 0.205 | 0.769 | 1.634 |
| 2 | | 0.862 | 0.870 | 0.192 |
| 3 | | −0.986 | −1.457 | −1.610 |
| 4 | | 0.919 | 0.819 | 0.785 |

In the zoom lens system mentioned above, the first group corresponds to the T1-adjustment group (first adjustment mechanism T1); the second group corresponds to the T3-adjustment group (third adjustment mechanism T3); and the entire zoom lens group corresponds to the T2-adjustment group (second adjustment mechanism T2), respectively. In this zoom lens system, the first method and the second method are performed as follows:

<First Method>

1. The operations at step 1 through 3 are carried out to make the positions of the focal plane at the long focal length extremity and the focal plane at the short focal length extremity coincident with each other, and thereafter, the deviation of the focal point therefrom at an intermediate focal length is measured (i.e., the focal plane shift of the focal plane at the intermediate focal length is measured).

ΔP(fM)=0.079

2. The displacement ΔT3 of the T3-adjustment group is obtained in accordance with the formulae 1, 2 and 3.

ΔT3=−0.288

The expansion correction sensitivity ΔPc(fM) at the intermediate focal length is given by:

ΔPc(fM)=0.272

3. The amount of adjustment ΔT3 is applied to the T3-adjustment group by the third adjustment mechanism T3.

4. The operations at steps 1 and 2 are repeated until the positions of the focal planes at the short focal length extremity and at the long focal length extremity are made coincident with the image forming surface of the camera.

<Second Method>

1. The focal plane shifts ΔP(fs), ΔP(fM) and ΔP(fL) at the short focal length extremity (S), at the intermediate focal length (M), and at the long focal length extremity (L), respectively, are measured from the image forming surface (reference point) 15.

ΔP(fs)=0.361

ΔP(fM)=0.700

ΔP(fL)=1.020

2. The amounts of adjustment Δt1, Δt2 and Δt3 of the T1-adjustment group, T2-adjustment group and T3-adjustment group are calculated using formulae 4 and 5.

T1-adjustment amount Δt1=−0.597

T2-adjustment amount Δt2=0.010

T3-adjustment amount Δt3=−0.288

3. The T1-adjustment group, T2-adjustment group and T3-adjustment group are moved by the T1-adjustment amount, the T2-adjustment amount, and the T3-adjustment amount, respectively.

Figure 4:
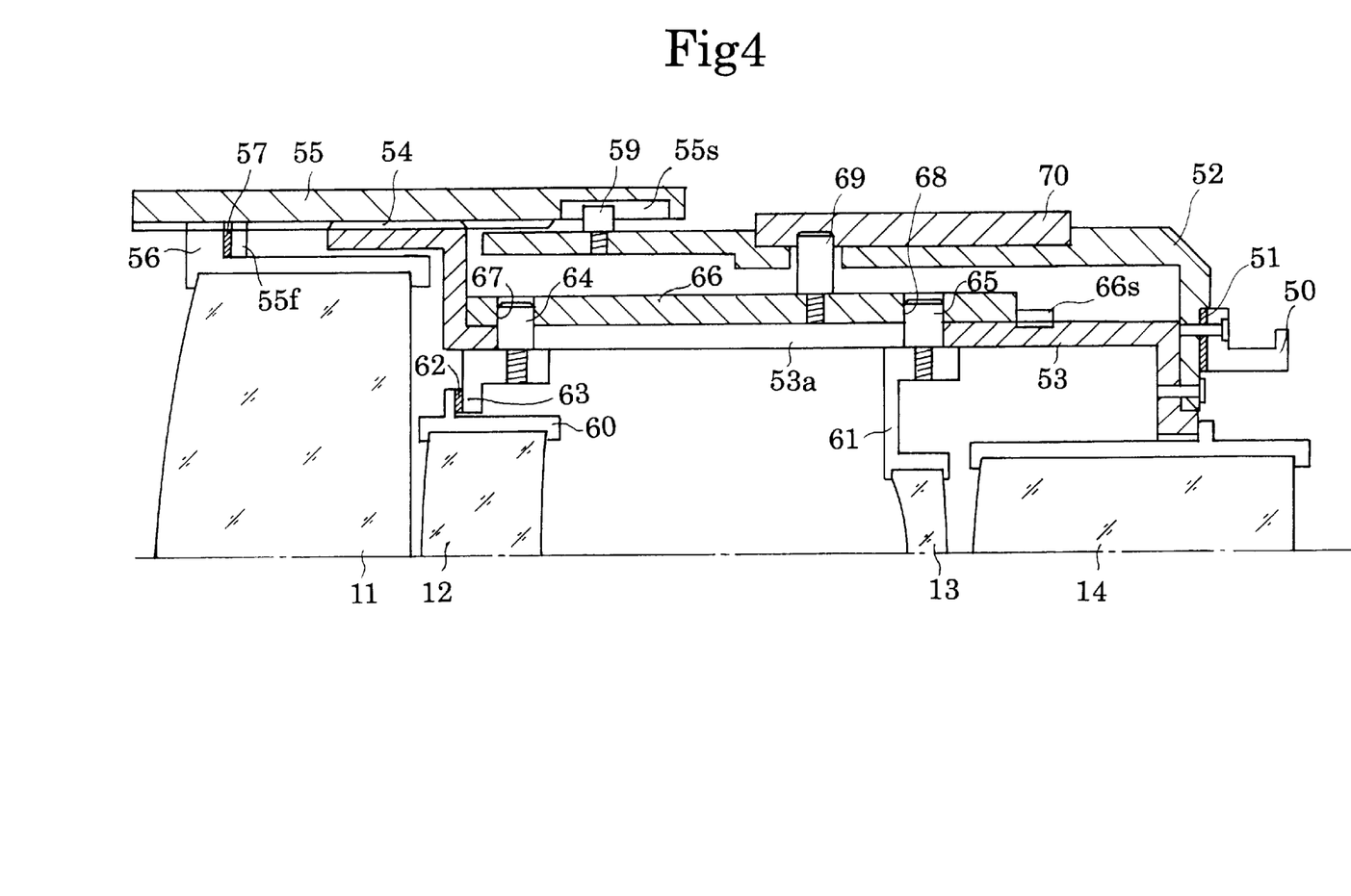

FIG. 4 shows an embodiment of an internal structure of a zoom lens barrel to which the present invention is applied. The zoom lens barrel is an interchangeable lens for a single lens reflex camera corresponding to the zoom lens system shown in FIG. 1. The zoom lens barrel includes four lens groups having a first lens group 11, a second lens group 12, a third lens group 13 and a fourth lens group 14, in this order from the object side. A lens mount ring 50 which is detachably attached to a camera body is provided with a mount securing outer ring 52 secured thereto through a spacer ring 51. A mount securing inner ring 53 is secured to the mount securing outer ring 52. The fourth lens group 14 is secured to the mount securing inner ring 53.

The mount securing inner ring 53 is screw-engaged, at its front end, into a focusing ring 55 via a fine screw thread 54. A first lens frame 56, to which the first lens group 11 abuts against, is secured to a position restriction flange 55f of the focusing ring 55 via a spacer ring 57. The focusing ring 55 is provided with a position restriction recess 55s in which a stop pin 59 secured to the mount securing outer ring 52 is engaged to restrict the movement of the focusing ring 55 in the optical axis direction thereof.

The second lens group 12 is secured to a second lens frame 60 and the third lens group 13 is secured to a third lens frame 61. The second lens frame 60 is secured to a follower ring 63 through a spacer ring 62. The follower ring 63 and the third lens frame 61 are respectively provided with radially extending follower pins 64 and 65 secured thereto. The follower pins 64 and 65 extend through a linear movement guide groove 53a formed in the mount securing inner ring 53 and extending in parallel with the optical axis and project outward from the mount securing inner ring 53. The follower pins 64 and 65 are fitted in cam grooves 67 and 68, respectively, of a cam ring 66 which is rotatably fitted onto the mount securing inner ring 53. The cam ring 66 is connected to a zoom ring 70 fitted on the mount securing outer ring 52 via a radial pin 69 so as to rotate together with the zoom ring 70. A slip-off prevention ring 66s is fitted on the mount securing inner ring 53 to prevent the cam ring 66 from moving in the optical axis direction.

In the zoom lens barrel constructed as above, when the zoom ring 70 is rotated, the cam ring 66 is rotated via the radial pin 69, so that the follower ring 63 (second lens group 12) and the third lens frame 61 (third lens group 13) are moved through the cam grooves 67, 68 and the linear movement guide groove 53a in the optical axis direction in accordance with predetermined cam profiles to perform the zooming operation. Moreover, when the rotation of the focusing ring 55 takes place, the first lens frame 56 (first lens group 11) is moved in the optical axis direction while rotating, through the fine thread 54 to perform the focusing operation.

In the zoom lens barrel constructed as above, the spacer ring 57 corresponds to the first adjustment mechanism T1; the spacer ring 51 corresponds to the second adjustment mechanism T2; and the spacer ring 62 corresponds to the third adjustment mechanism T3, respectively. It is possible to adjust the position of the first lens group 11, the entirety of the first through fourth lens groups 11 through 14, and the second lens group 12 in the optical axis direction by varying the thickness of the spacer rings 57, 51 and 62, upon assembly and adjustment. Thus, the adjusting method of the present invention can be carried out.

Although the zoom lens barrel shown in FIG. 4 corresponds to the zoom lens system shown in FIG. 1, there are known zoom lens barrels for the zoom lens systems shown in FIGS. 2 and 3. FIG. 4 merely shows an example of a zoom lens barrel and the present invention is not limited thereto and can be applied to other zoom lens barrels.

As may be understood from the foregoing, particularly in a zoom lens system having three or more lens groups, the zoom adjustment can be mechanically and precisely carried out.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising at least three lens groups, in which the distance between at least two lens groups of said at least three lens groups is varied during zooming, said zoom lens system comprising:

a first adjustment mechanism for mechanically adjusting a first lens group of said at least three lens groups in the optical axis direction upon assembly and adjustment;

a second adjustment mechanism for mechanically adjusting a second lens group of said at least three lens groups, which is different from said first lens group, in the optical axis direction upon assembly and adjustment; and a third adjustment mechanism for mechanically adjusting a third lens group of said at least three lens groups, which is different from said first and second lens group, in the optical axis direction upon assembly and adjustment.

2. A zoom lens system comprising at least three lens groups, in which the distance between at least two lens groups of said at least three lens groups is varied during zooming, said zoom lens system comprising:

a first adjustment mechanism for mechanically adjusting a first lens group, of said at least three lens groups, closest to the object side in the optical axis direction upon assembly and adjustment;

a second adjustment mechanism for mechanically adjusting a second lens group, of said at least three lens groups, closest to the image side in the optical axis direction upon assembly and adjustment; and a third adjustment mechanism for mechanically adjusting a variable power lens group, of said at least three lens groups, upon assembly and adjustment; wherein said variable power lens group is one of moved and not moved during zooming in the optical axis direction.

3. An adjusting method for a zoom lens system comprising at least three lens groups in which the distance between at least two lens groups of said at least three lens groups is varied during zooming, said zoom lens system being provided with a first adjustment mechanism which adjusts a position of a first lens group of said at least three lens groups closest to the object side in the optical axis direction, upon assembly and adjustment; a second adjustment mechanism which adjusts a position of one of all of said at least three lens groups and a lens group closest to the image side in the optical axis direction, upon assembly and adjustment; and a third adjustment mechanism which adjusts a position of a variable power lens group of said at least three lens groups in the optical axis direction upon assembly and adjustment, wherein said variable power lens group is one of moved and not moved during zooming; wherein said adjusting method comprises:

performing a correction to make the positions of the focal planes at the short focal length extremity and at the long focal length extremity of said zoom lens system coincident with an image forming plane of a camera, using said first and second adjustment mechanisms;

measuring a focal plane shift at an intermediate focal length of said zoom lens system and performing an adjustment to make the positions of the focal planes, of said zoom lens system, at the short focal length extremity, at the long focal length extremity and at the intermediate focal length coincident with each other; and performing a correction to make the positions of the focal plane, of said zoom lens system, at the short focal length extremity and at the long focal length extremity coincident with the image forming surface of the camera, using said first and second adjustment mechanisms.

4. The adjusting method for a zoom lens system according to claim 3, wherein the following condition is satisfied (1):

$$0.01 < |\Delta P(fM)/\Delta t3| < 0.9 \tag{1}$$

wherein $\Delta t_3$ designates the amount of adjustment performed by said third adjustment mechanism;

$\Delta P(fM)$ designates the focal plane shift at the intermediate focal length after the positions of the focal planes at the short focal length extremity and at the long focal length extremity are made coincident with the image forming surface of the camera.

5. An adjusting method for a zoom lens system comprising at least three lens groups in which the distance between at least two lens groups of said at least three lens groups is varied during zooming, said zoom lens system being provided with a first adjustment mechanism which adjusts a position of a first lens group of said at least three lens groups closest to the object side in the optical axis direction, upon assembly and adjustment; a second adjustment mechanism which adjusts a position of one of all of said at least three lens groups and a lens group closest to the image side in the optical axis direction, upon assembly and adjustment; and a third adjustment mechanism which adjusts a position of a variable power lens group of said at least three lens groups which is one of moved and not moved during zooming in the optical axis direction, upon assembly and adjustment; wherein said adjusting method comprises:

measuring the focal plane shifts $\Delta P(fS)$, $\Delta P(fM)$ and $\Delta P(fL)$ at the short focal length extremity fS, at an intermediate focal length fM, and at the long focal length extremity fL, respectively, from a reference point;

calculating the amounts of adjustment $\Delta t_1$, $\Delta t_2$ and $\Delta t_3$ by the first, second and third adjustment mechanisms, using the measurements of $\Delta P(fS)$, $\Delta P(fM)$ and $\Delta P(fL)$; by the following sensitivity matrix A of the first, second and third adjustment mechanisms which is represented by the following formula 4; and by the following formula 5:

$$A = \begin{bmatrix} \frac{\partial Pc(f_S)}{\partial t_1} & \frac{\partial Pc(f_S)}{\partial t_2} & \frac{\partial Pc(f_S)}{\partial t_3} \\ \frac{\partial Pc(f_M)}{\partial t_1} & \frac{\partial Pc(f_M)}{\partial t_2} & \frac{\partial Pc(f_M)}{\partial t_3} \\ \frac{\partial Pc(f_L)}{\partial t_1} & \frac{\partial Pc(f_L)}{\partial t_2} & \frac{\partial Pc(f_L)}{\partial t_3} \end{bmatrix} \quad \text{Formula 4}$$

$$\begin{bmatrix} \Delta t_1 \\ \Delta t_2 \\ \Delta t_3 \end{bmatrix} = -A^{-1} \begin{bmatrix} P(f_S) \\ P(f_M) \\ P(f_L) \end{bmatrix} \quad \text{Formula 5}$$

(Wherein, $|A| \neq 0$)

and;

moving said at least three lens groups by the respective amounts of adjustment $\Delta t_1$, $\Delta t_2$ and $\Delta t_3$ by the first, second and third adjustment mechanisms.

* * * * *